(12) United States Patent
Song et al.

(10) Patent No.: US 12,515,624 B2
(45) Date of Patent: Jan. 6, 2026

(54) SYSTEM AND METHOD OF CONTROLLING BRAKE MODE FOR VEHICLE

(71) Applicants: Hyundai Motor Company, Seoul (KR); Kia Corporation, Seoul (KR)

(72) Inventors: Rui Song, Shandong (CN); Zai Xu Zhang, Shandong (CN); Qing Yi Chen, Shandong (CN); Seoktae Son, Shandong (CN); Zhang Zhang, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 637 days.

(21) Appl. No.: 17/946,323

(22) Filed: Sep. 16, 2022

(65) Prior Publication Data

US 2023/0103253 A1 Mar. 30, 2023

(30) Foreign Application Priority Data

Sep. 17, 2021 (CN) .......................... 202111091561.3

(51) Int. Cl.
*B60T 7/22* (2006.01)
*B60T 7/04* (2006.01)
*B60T 8/40* (2006.01)

(52) U.S. Cl.
CPC ............ *B60T 8/4081* (2013.01); *B60T 7/042* (2013.01); *B60T 2210/32* (2013.01); *B60T 2220/03* (2013.01); *B60T 2230/02* (2013.01); *B60T 2240/00* (2013.01); *B60T 2250/00* (2013.01); *B60T 2250/03* (2013.01)

(58) Field of Classification Search
CPC .................................. B60T 7/042; B60T 7/22
See application file for complete search history.

(56) References Cited

U.S. PATENT DOCUMENTS

| | | | | |
|---|---|---|---|---|
| 2006/0276289 A1* | 12/2006 | Hirata | .................... | B60W 10/02 475/5 |
| 2007/0032914 A1* | 2/2007 | Kondoh | ................ | B60W 50/16 701/1 |
| 2007/0168128 A1* | 7/2007 | Tokoro | ................... | G01S 13/867 701/301 |
| 2008/0295506 A1* | 12/2008 | Saito | ...................... | B60T 8/1755 701/41 |
| 2019/0084534 A1* | 3/2019 | Kasper | ................ | B60R 16/0315 |
| 2019/0286127 A1* | 9/2019 | Watanabe | ............ | G05D 1/0061 |

(Continued)

*Primary Examiner* — Long T Tran
(74) *Attorney, Agent, or Firm* — Fox Rothschild LLP (57) ABSTRACT

A brake mode control system and a brake mode control method for a vehicle are disclosed. The brake mode control system comprises a user interface, a driving information sensor, a braking controller, and a brake mode control panel. The user interface is configured to receive a brake mode input by a driver, the driving information sensor is configured to sense driving information of the vehicle, the braking controller is configured to determine a driving state of the vehicle based on the driving information of the vehicle sensed by the driving information sensor and selectively change the brake mode received by the user interface according to the determined driving state of the vehicle to achieve a final brake mode, and the brake mode control panel is configured to generate a different braking feel according to a pedal action force required for a pedal stroke based on the final brake mode.

15 Claims, 6 Drawing Sheets

(56) References Cited

U.S. PATENT DOCUMENTS

| | | | |
|---|---|---|---|
| 2021/0179040 A1* | 6/2021 | Hwang | B60T 17/221 |
| 2021/0300259 A1* | 9/2021 | Shibata | B60K 35/29 |
| 2022/0289174 A1* | 9/2022 | Hashimoto | B60W 60/0015 |

* cited by examiner

SYSTEM AND METHOD OF CONTROLLING BRAKE MODE FOR VEHICLE

CROSS-REFERENCE TO RELATED APPLICATION(S)

This application claims, under 35 U.S.C. § 119 (a), the benefit of Chinese Patent Application No. 202111091561.3 filed in the Chinese National Intellectual Property Administration on Sep. 17, 2021, the disclosure of which is incorporated herein by reference in its entirety.

BACKGROUND

Technical Field

Embodiments of the present disclosure relate to brake control of a vehicle, and more particularly, to a system and a method of controlling brake mode for a vehicle.

Description of the Related Art

As vehicle technologies advance, people's demands for power, economic feasibility, stability, controllability, and comfort of the vehicle are increasing. In vehicles such as electric vehicles (EVs) or hybrid electric vehicles (HEVs), electronically controlled brake technology is used. According to the electronically controlled brake technology, when a driver presses a braking pedal, an input pushrod is displaced by action of a connecting rod, and a pedal stroke sensor detects a signal generated due to the displacement of the input pushrod and transmits the signal to an electronic control unit (ECU). The ECU calculates torque to be generated by a motor and sends the corresponding signal to the motor. After receiving the signal, the motor converts torque into braking force using a ball screw and a master cylinder to implement braking. Accordingly, the braking force in an environment-friendly vehicle is adjustable.

Recently, in order to enhance marketability by improving safety, controllability, and comfort of the vehicle, vehicle manufacturers provide different brake modes (hard mode, soft mode, and normal mode) through an integrated instrument panel of the vehicle, or an Audio, Video, Navigation and Telematics (AVNT) system, thereby allowing a driver to select the brake mode according to driving preference.

However, in the conventional art, once a driver inputs the brake mode, the input brake mode cannot be automatically changed according to an actual driving situation during the driving. For example, when emergency braking is required in the course of the driving (for example, in the case of avoiding pedestrians or other vehicles appearing in front or rear of the vehicle), or when braking is not desired (for example, when the vehicle slides sideways), driving safety may be ensured by changing the selected brake mode to cope with such a sudden driving situation.

Accordingly, there is a need for a braking control technology to handle a sudden driving situation as the brake mode input by the driver in advance is automatically changed according to the actual driving situation.

The above information disclosed in this Background section is only for enhancement of understanding of the background of the disclosure, and therefore it may contain information that does not form the existing technologies that are already known in this country to a person of ordinary skill in the art.

SUMMARY

The present disclosure has been made in an effort to provide a braking control technology having advantages of coping with a sudden driving situation by automatically changing a brake mode input by a driver in advance depending on an actual driving situation.

A brake mode control system for a vehicle according to an aspect of the present disclosure may comprise a user interface, a driving information sensor, a braking controller, and a brake mode control panel. The user interface is configured to receive a brake mode input by a driver, the driving information sensor is configured to sense driving information of the vehicle, the braking controller is configured to determine a driving state of the vehicle based on the driving information of the vehicle sensed by the driving information sensor and selectively change the brake mode received by the user interface according to the determined driving state of the vehicle to achieve a final brake mode, and the brake mode control panel is configured to generate a different braking feel according to a pedal action force required for a pedal stroke based on the final brake mode.

The brake mode may comprise a hard mode, a soft mode, and a normal mode.

The driving information sensor may comprise a side slip sensing module comprising a yaw rate sensor, a wheel speed sensor, a steering angle sensor, a lateral direction acceleration sensor, and a longitudinal direction acceleration sensor.

The braking controller may be configured to determine whether the vehicle is in a side slip state, determines whether the input brake mode is a hard mode if the vehicle is in the side slip state, and maintains the hard mode unchanged if the input brake mode is the hard mode and switch the brake mode to the hard mode if the input brake mode is not the hard mode.

The braking controller may be configured to calculate a yaw rate calculation value based on a sensing value from each of the wheel speed sensor, the steering angle sensor, the lateral direction acceleration sensor, and the longitudinal direction acceleration sensor, and compares a yaw rate sensing value from the yaw rate sensor with the calculated yaw rate calculation value to determine whether the vehicle is in the side slip state according to a result of the comparison.

The driving information sensor may further comprise an obstacle sensing module, wherein the obstacle sensing module may comprise a front camera configured to acquire front image information of the vehicle and position information and speed information of an obstacle in front of the vehicle, a front radar configured to acquire the position information and the speed information of the obstacle in front of the vehicle, and at least two rear corner radars configured to acquire position information and speed information of an obstacle in rear or side-rear of the vehicle, and wherein the obstacle sensing module calculates an expected time-to-collision between the vehicle and the obstacle in front, rear, or side-rear of the vehicle based on the acquired information.

The braking controller may be configured to further determine whether the vehicle is in a collision risk state if the vehicle is not in the side slip state, determine whether the input brake mode is a soft mode if the vehicle is in the collision risk state, maintain the soft mode unchanged if the input brake mode is the soft mode, and switch the brake mode to the soft mode if the input brake mode is not the soft mode.

The braking controller may be configured to compare the expected time-to-collision calculated by the obstacle sensing module with a predetermined reference time and determine whether there is a risk that the vehicle will collide with the obstacle to determine whether the vehicle is in the collision risk state.

The braking controller may be further configured to return the brake mode to the originally input brake mode if the vehicle is in a normal state after the brake mode is switched.

According to another aspect of the present disclosure, there is provided a brake mode control method for a vehicle including receiving, by a user interface, a brake mode input by a driver, sensing, by a driving information sensor, driving information of the vehicle, determining, by a braking controller, a driving state of the vehicle based on the driving information of the vehicle sensed by the driving information sensor, selectively changing, by the braking controller, the brake mode received by the user interface according to the determined driving state of the vehicle to achieve a final brake mode, and generating, by a brake mode control panel, a different braking feel according to a pedal action force required for a pedal stroke based on the final brake mode.

The brake mode may comprise a hard mode, a soft mode, and a normal mode.

The driving information sensor may comprise a side slip sensing module, and the side slip sensing module may comprise a yaw rate sensor, a wheel speed sensor, a steering angle sensor, a lateral direction acceleration sensor, and a longitudinal direction acceleration sensor.

The method may further comprise determining, by the braking controller, whether the vehicle is in a side slip state, determining, by the braking controller, whether the input brake mode is a hard mode if the vehicle is in the side slip state, and maintaining, by the braking controller, the hard mode unchanged if the input brake mode is the hard mode, and switching, by the braking controller, the brake mode to the hard mode if the input brake mode is not the hard mode.

The determining whether the vehicle is in the side slip state may comprise calculating, by the braking controller, a yaw rate calculation value based on a sensing value from each of the wheel speed sensor, the steering angle sensor, the lateral direction acceleration sensor, and the longitudinal direction acceleration sensor, and comparing, by the braking controller, a yaw rate sensing value from the yaw rate sensor with the calculated yaw rate calculation value to determine whether the vehicle is in the side slip state according to a result of the comparison.

The driving information sensor may further comprise an obstacle sensing module, wherein the obstacle sensing module may comprise a front camera configured to acquire front image information of the vehicle and position information and speed information of an obstacle in front of the vehicle, a front radar configured to acquire the position information and the speed information of the obstacle in front of the vehicle, and at least two rear corner radars configured to acquire position information and speed information of an obstacle in rear or side-rear of the vehicle, and wherein the obstacle sensing module is configured to calculate an expected time-to-collision between the vehicle and the obstacle in front, rear, or side-rear of the vehicle based on the acquired information.

The method may further comprise determining, by the braking controller, whether the vehicle is in a collision risk state if the vehicle is not in the side slip state, determining, by the braking controller, whether the input brake mode is a soft mode if the vehicle is in the collision risk state, and maintaining, by the braking controller, the soft mode unchanged if the input brake mode is the soft mode, and switching the brake mode to the soft mode if the input brake mode is not the soft mode.

The determining whether the vehicle is in the collision risk state may comprise determining, by the braking controller, whether there is a risk that the vehicle will collide with an obstacle to determine whether the vehicle is in the collision risk state by comparing the expected time-to-collision calculated by the obstacle sensing module with a predetermined reference time. The method may further comprise returning, by the braking controller, the brake mode to the originally input brake mode if the vehicle is in a normal state after the brake mode is switched.

In a further aspect, vehicles are provided that comprise a brake model; control system as disclosed herein. Thus, in one aspect, a vehicle is provide that comprises a brake mode control system for a vehicle, the system comprising (a) a user interface configured to receive a brake mode input by a driver; (b) a driving information sensor configured to sense driving information of the vehicle; (c) a braking controller configured to: (i) determine a driving state of the vehicle based on the driving information of the vehicle sensed by the driving information sensor; and (ii) selectively change the brake mode received by the user interface according to the determined driving state of the vehicle to achieve a final brake mode; and (d) a brake mode control panel configured to generate a different braking feel according to a pedal action force required for a pedal stroke based on the final brake mode.

Preferred aspects of the present disclosure can provide the following advantageous effects, among others.

After the brake mode is input by the driver, by coping with the sudden driving situation through automatic changing, the brake mode input in advance for a case when emergency braking may be required, or when braking is not desired depending on the actual driving situation, it may be possible to improve driving safety while satisfying driving preferences of the driver.

In addition, the effects obtainable or predicted by an exemplary embodiment of the present disclosure are to be disclosed directly or implicitly in the detailed description of an exemplary embodiment of the present disclosure. In other words, various effects predicted according to an exemplary embodiment of the present disclosure will be disclosed in the detailed description to be described later.

BRIEF DESCRIPTION OF THE DRAWINGS

One aspect and/or another aspect of the present application will become apparent and more readily understood through the following description of exemplary embodiments shown in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

The present disclosure is described with reference to various modifications and various exemplary embodiments, wherein specific exemplary embodiments may be shown in the drawings and described in detail in the specification. However, the exemplary embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. As used herein, the term "and/or" includes any one and any combination of any two or more of the associated listed items. Throughout the specification, unless expressly stated to the contrary, terms such as "comprising" or "containing" should be understood to imply the inclusion of the element but not the exclusion of any other element. In addition, the terms "~part", "~group", "~member", and "module" described in the specification indicate a unit for performing at least one function and operation and may be implemented by hardware, software, or a combination thereof.

Hereinafter, example embodiments of the present disclosure will be described with reference to FIGS. 1 to 6.

Figure 1:
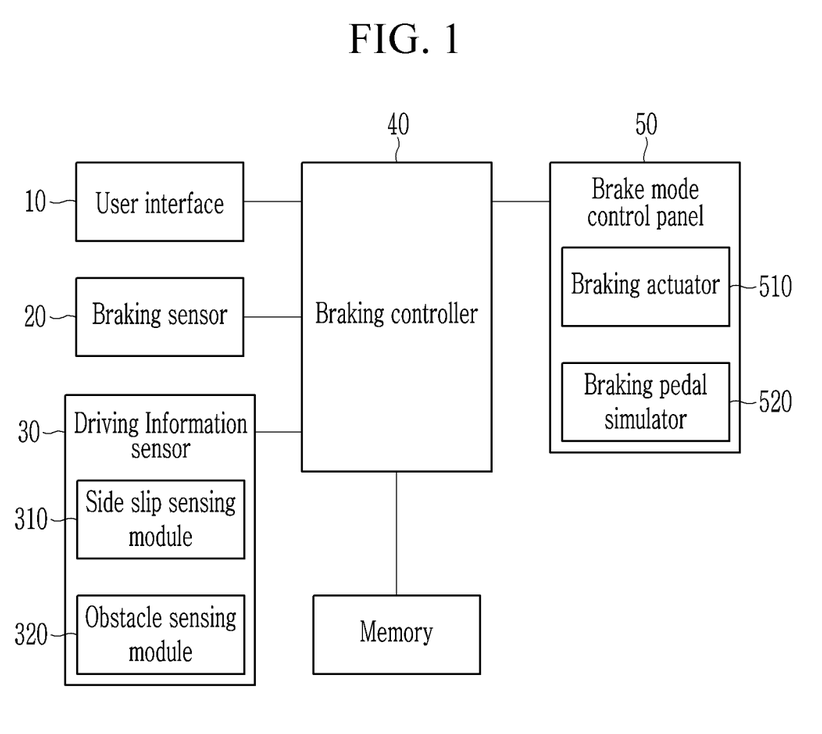
FIG. 1 is a diagram illustrating a configuration of a brake mode control system for a vehicle according to an exemplary embodiment of the present disclosure.
Figure 2:
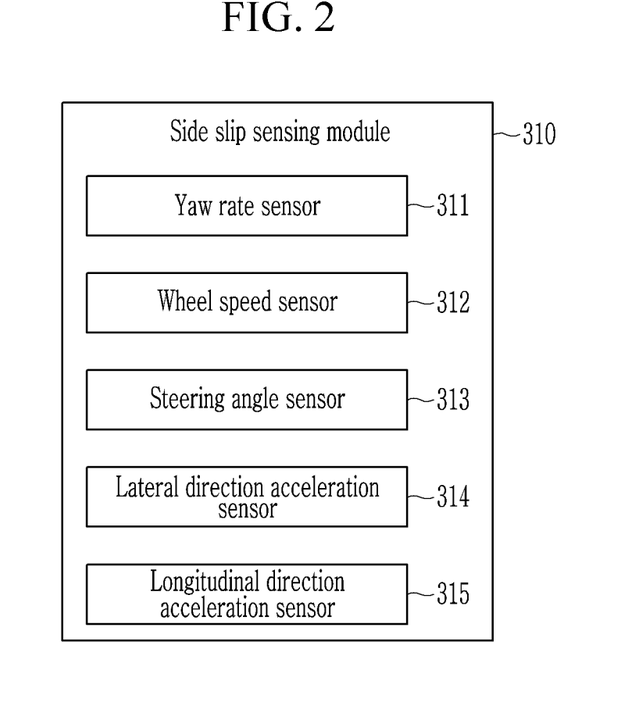
FIG. 2 shows a schematic diagram of a side slip sensing module in the brake mode control system for the vehicle shown in FIG. 1.
Figure 3:
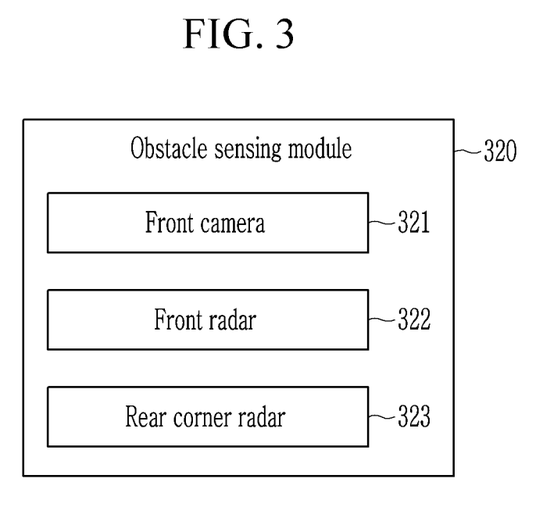
FIG. 3 shows a schematic diagram of an obstacle sensing module in the brake mode control system for the vehicle shown in FIG. 1.
Figure 4:
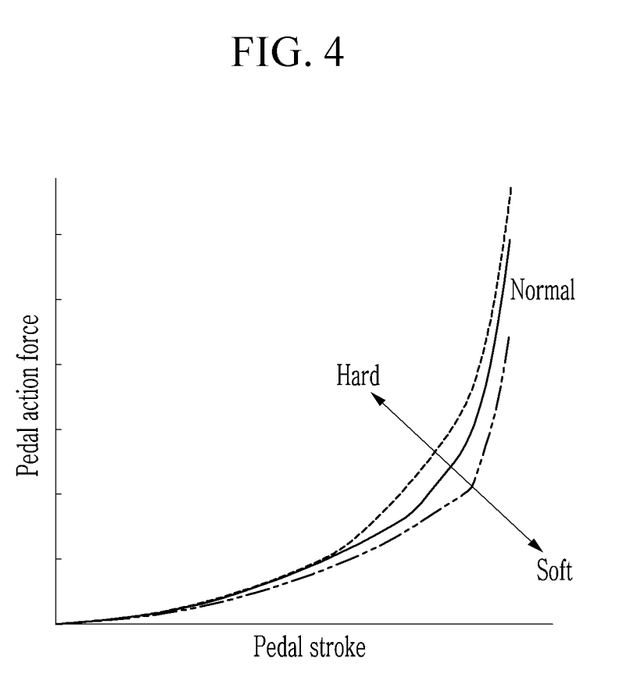
FIG. 4 shows a schematic diagram of switching a brake mode using a brake mode control system for a vehicle according to an exemplary embodiment of the present disclosure.

FIG. 1 is a diagram illustrating a configuration of a brake mode control system for a vehicle according to an exemplary embodiment of the present disclosure, FIG. 2 shows a schematic diagram of a side slip sensing module in the brake mode control system for the vehicle shown in FIG. 1, FIG. 3 shows a schematic diagram of an obstacle sensing module in the brake mode control system for the vehicle shown in FIG. 1, and FIG. 4 shows a schematic diagram of switching a brake mode using the brake mode control system for the vehicle according to an exemplary embodiment of the present disclosure. Referring to FIG. 1, the brake mode control system for a vehicle according to an exemplary embodiment of the present disclosure includes a user interface 10, a braking sensor 20, a driving information sensor 30, a braking controller 40, and a brake mode control panel 50. The user interface 10 is configured to receive a brake mode input by a driver, the braking sensor 20 is configured to sense whether a braking pedal is pressed, and the driving information sensor 30 is configured to sense driving information of the vehicle. The braking controller 40 is configured to determine driving state of the vehicle based on the driving information of the vehicle sensed by the driving information sensor 30 if pressing of the braking pedal is sensed by the braking sensor 20 and implement a final brake mode by selectively changing a brake mode received by the user interface 10 based on the determined driving state of the vehicle. The brake mode control panel 50 is configured to generate different braking feels according to a pedal action force required for a pedal stroke based on the final brake mode. According to another embodiment of the present disclosure, the braking controller 40 may be configured to change the brake mode received by the user interface 10 according to the driving state of the vehicle without checking whether the braking pedal is pressed. Specifically, the braking controller 40 determines the driving state of the vehicle based on the driving information of the vehicle sensed by the driving information sensor 30, and selectively changes the brake mode received by the user interface 10 according to the determined driving state of the vehicle so as to implement the final brake mode. The braking controller 40 may be integrally formed with the ECU of the vehicle or may be implemented separately from the ECU so as to be connected to the ECU of the vehicle through a separate connector.

Electronic constituent elements constituting the brake mode control system may be configured to communicate with each other through a vehicle communication network. For example, the electronic constituent elements may be configured to communicate data through Ethernet, Media Oriented System Transport (MOST), FlexRay, Controller Area Network (CAN), or Local Interconnect Network (LIN).

The user interface 10 may be configured to be installed in an integrated instrument panel or an AVNT system, and may comprise an input device and an output device. The input device is for receiving a control instruction from a user, and the output device is for displaying information of a function currently executed in the vehicle and/or information input by the user. In this case, the input device may comprise a press key, and may also include a mouse, a joystick, a knob, or a stylus. In addition, the input device may comprise a soft keyboard implemented on the display. The output device may comprise a display. When a touch sensor such as a touch film, a touch sheet, or a touch panel is included in the display, the display may be configured to operate as a touch screen, and the input device and the output device may be integrally implemented.

Here, the display may comprise at least one of a liquid crystal display (LCD), a thin film transistor liquid crystal display (TFT-LCD), an organic light emitting diode (OLED), a flexible display, a field emission display (FED), or a three-dimensional (3D) display.

The user interface 10 may be configured to display at least one user setting menu (e.g., a user setting menu for selecting a driving mode, and a user setting menu for selecting a brake mode), and the driver may be configured to input a brake mode that suits the driving preference of the driver trough the user setting menu for selecting the brake mode. The brake mode may comprise a hard mode, a soft mode, and a normal mode, but is not limited thereto. Referring to FIG. 4, the hard mode refers to a brake mode in which a pedal action force required to obtain a pedal stroke generating the same braking force is relatively large compared to the normal mode. Conversely, the soft mode refers to a brake mode in which a pedal action force required to obtain a pedal stroke generating the same braking force is relatively small compared to the normal mode. When the driver inputs the brake mode through the user interface 10, the user interface 10 transmits the brake mode information input by the driver to the braking controller 40 through the vehicle communication network.

The braking sensor 20 may comprise a pedal stroke sensor that senses the driver's braking intention from the braking pedal. When the driver presses the braking pedal, the braking sensor 20 transmits a braking pedal detection signal to the braking controller 40 through the vehicle communication network.

According to an exemplary embodiment of the present disclosure, upon reception of the braking pedal detection signal from the braking sensor 20, the braking controller 40 determines the driving state (normal state, side slip state, collision risk state, etc.) of the vehicle. Alternatively, according to another embodiment of the present disclosure, the driving state of the vehicle may be determined even if the braking pedal detection signal is not received from the braking sensor 20.

Specifically, the braking controller 40 first determines whether the vehicle is in the side slip state. While driving the vehicle, the side slip of the vehicle may occur due to steering in a situation with a low road surface adhesion coefficient (e.g., wet and slippery road surface due to rain or snow, dirt present on the road surface, or road icing), improper braking (e.g., excessive braking), or improper steering operation (e.g., quick manipulation of a steering wheel). When the side slip of the vehicle occurs, the vehicle may be configured to easily roll over if the driver suddenly presses the braking pedal. Accordingly, the braking controller 40 of an exemplary embodiment of the present disclosure automatically control the brake mode input by the driver to obtain a brake mode appropriate for the side slip state of the vehicle.

To this end, the driving information sensor 30 according to an exemplary embodiment of the present disclosure includes a side slip sensing module 310. Referring to FIG. 2, the side slip sensing module 310 includes a yaw rate sensor 311, a wheel speed sensor 312, a steering angle sensor 313, a lateral direction acceleration sensor 314, and a longitudinal direction acceleration sensor 315. The side slip sensing module 310 uses the yaw rate sensor 311, the wheel speed sensor 312, the steering angle sensor 313, the lateral direction acceleration sensor 314, and the longitudinal direction acceleration sensor 315, respectively to sense the yaw rate and wheel rotation speed of the vehicle as well as the steering angle of the steering wheel, lateral direction acceleration, and longitudinal direction acceleration and to transmit the sensing values to the braking controller 40 through the vehicle communication network. The braking controller 40 calculates a yaw rate calculation value based on the sensing values received from the wheel speed sensor 312, the steering angle sensor 313, the lateral direction acceleration sensor 314, and the longitudinal direction acceleration sensor 315, and compares the yaw rate sensing value received from the yaw rate sensor 311 with the calculated yaw rate calculation value. According to the compared result, when a difference between the yaw rate sensing value and the yaw rate calculation value exceeds a predetermined range of the braking controller 40, the braking controller 40 determines that the side slip of the vehicle has occurred. Specifically, if the yaw rate sensing value is greater than the yaw rate calculation value, the braking controller 40 determines that oversteer of the vehicle has occurred, and if the yaw rate sensing value is less than the yaw rate calculation value, the braking controller 40 determines that understeer of the vehicle has occurred. The brake mode control system for a vehicle according to an exemplary embodiment of the present disclosure may further comprise a memory, and a predetermined range of the braking controller 40 may be stored in the memory in advance.

The memory may be implemented by at least one of a non-volatile storage device, a volatile storage device, and a storage medium. The non-volatile storage device includes, for example, a cache, a Read-Only Memory (ROM), a Programmable ROM (PROM), an Erasable PROM (EPROM), an Electrically EPROM (EEPROM), or a flash memory. The volatile storage device is, for example, Random Access Memory (RAM), and the storage medium is, for example, Hard Disk Drive (HDD) or CD-ROM, but are not limited thereto.

When it is determined that the side slip of the vehicle has occurred, the braking controller 40 determines whether the brake mode input by the driver is the hard mode. If the input brake mode is determined to be the hard mode, the braking controller 40 continues to maintain the hard mode unchanged. If the input brake mode is determined not to be the hard mode (e.g., the input brake mode is the soft mode or the normal mode), the braking controller 40 switches the input brake mode to the hard mode, thereby ensuring driving safety of the vehicle. In the hard mode, if the driver applies the same action force, braking is relatively difficult compared to the soft mode or the normal mode. In other words, the same braking force may be obtained only by applying more action force.

Alternatively, the braking controller 40 may be configured to determine whether the vehicle is in the side slip state based on an activation state of an electronic stability program. When the ESP is activated, the braking controller 40 may be configured to determine that the vehicle is in the side slip state.

If it is determined that the side slip of the vehicle has not occurred, the braking controller 40 further determines whether the vehicle is in a collision risk state, for example, whether there is possibility that the vehicle will collide with an obstacle (other vehicles, pedestrians, etc.) at front, rear, or side-rear. When emergency braking is required due to obstacles existing at front, rear, or side-rear while the vehicle is moving forward or backward, the vehicle must increase the braking force to shorten a braking distance. Accordingly, the braking controller 40 according to an exemplary embodiment of the present disclosure automatically controls the brake mode input by the driver to obtain the brake mode appropriate for the collision risk state of the vehicle.

To this end, the driving information sensor 30 according to an exemplary embodiment of the present disclosure further includes an obstacle sensing module 320. Referring to FIG. 3, the obstacle sensing module 320 includes a front camera 321, a front radar 322, and at least two rear corner radars 323. Specifically, the front camera 321 may be disposed on a windshield at the front of the vehicle or may be disposed on a front panel inside the vehicle, an inside rearview mirror, or a roof panel exposed to the outside. The front camera 321 may also be disposed on a license plate, a grill shutter, or a logo portion at the front of the vehicle. The front camera 321 may be configured to photograph the front of the vehicle to obtain front image information of the vehicle as well as position information and speed information of an obstacle at the front of the vehicle. The front radar 322 may be configured to be mounted, for example, on the grill shutter or a front bumper of the vehicle. The at least two rear corner radars 323 may comprise a rear corner radar mounted on the left side of a rear bumper of the vehicle and a rear corner radar mounted on the right side of the rear bumper of the vehicle. The front radar 322 and the rear corner radar 323 calculate a relative distance to the obstacle based on a frequency difference (or time difference) between an emitted wave and a reflected wave, and also calculate a relative speed of the obstacle based on the frequency difference between the emitted wave and the reflected wave. Additionally, when the vehicle moves forward, the obstacle sensing module 320 uses the front camera 321 or the front radar 322 to calculate an expected time-to-collision (TTC) between the vehicle and the obstacle based on position information (relative distance) and speed information (relative speed) of the front obstacle acquired by the front camera 321 or the front radar 322 so as to transmit the calculated expected time-to-collision (TTC) to the braking controller 40 through the vehicle communication network. Alternatively, the obstacle sensing module 320 uses the front image information of the vehicle as well as the position information (relative distance) and the speed information (relative speed) of the front obstacle respectively obtained by the front camera 321 or the front radar 322 to calculate the expected time-to-collision (TTC) between the vehicle and the obstacle based on data fusion and can transmit the calculated expected time-to-collision (TTC) between the vehicle and the front obstacle. Similarly, when the vehicle is reversing, the obstacle sensing module 320 calculates the expected time-to-collision (TTC) between the vehicle and the rear or side-rear obstacle based on the position information (relative distance) and the speed information (relative speed) of the rear or side-rear obstacle obtained by the rear corner radar 323, and can transmit the calculated expected time-to-collision (TTC) to the braking controller 40 through the vehicle communication network.

To this end, the obstacle sensing module 320 may further comprise a memory (not shown) and a processor (not shown), and the memory stores an algorithm of an operation for calculating the expected time-to-collision (TTC) between the vehicle and the obstacle in front (rear, side-rear) of the vehicle or data related to a program for simulating the algorithm, and the processor executes the operation using the data stored in the memory. In this case, the memory and the processor may be implemented in the form of separate chips. Alternatively, the memory and the processor may be implemented in the form of a single chip.

The braking controller 40 compares the received expected time-to-collision (TTC) with a predetermined reference time to determine that there is a risk of collision between the vehicle and the obstacle in front (rear, side-rear) of the vehicle if the expected time-to-collision (TTC) is less than the predetermined reference time, thereby determining that the vehicle is in the collision risk state. When it is determined that the vehicle is in the collision risk state, the braking controller 40 determines whether the brake mode input by the driver is the soft mode. When the input brake mode is determined to be the soft mode, the braking controller 40 continues to maintain the soft mode unchanged. When the input brake mode is determined not to be the soft mode (e.g., the input brake mode is the hard mode or normal mode), the braking controller 40 switches the input brake mode to the soft mode, thereby preventing the collision between the vehicle and the obstacle. In this case, when the driver applies the same action force, the braking works relatively easily compared to the hard mode or normal mode. In other words, less action force is required to obtain the same braking force. The predetermined reference time may be stored in the memory in advance.

The obstacle sensing module 320 may further comprise at least one of a light detection and ranging (LIDAR) sensor and an ultrasonic wave sensor.

Alternatively, the braking controller 40 may be configured to determine whether the vehicle is in the collision risk state based on an activation state of an advanced driver assistance system (ADAS). When the ADAS (e.g., a Front Collision warning (FCW) or a Rear Cross-Traffic Collision Warning (RCCW)) is activated, the braking controller 40 may be configured to determine that the vehicle is in the collision risk state where the collision may occur.

After the input brake mode is switched to the soft mode, the braking controller 40 continues to monitor the driving state of the vehicle. When it is determined that the vehicle is restored to the normal driving state, the braking controller 40 returns the brake mode to the originally input brake mode and uses the brake mode suitable for the driving preference of the driver.

According to an exemplary embodiment of the present disclosure, the braking controller 40 transmits a signal corresponding to the determined brake mode to the brake mode control panel 50, and the brake mode control panel 50 makes the vehicle to brake based on the received brake mode.

Referring to FIGS. 1 and 4, the brake mode control panel 50 according to an exemplary embodiment of the present disclosure includes a braking actuator 510 and a braking pedal simulator 520. Braking actuator 510 includes two types of braking actuator constituent elements including a braking actuator hydraulic pressure system constituent element and a braking actuator motor constituent element. Particularly, the braking actuator motor constituent element rotates to control movement of a pump piston by pushing or pulling a ball screw, thereby creating or releasing pressure in a master cylinder. The braking controller 40 controls the rotation of a braking valve and a motor unit according to a relationship between the pressure of the master cylinder and a pedal stroke to change the pressure of the master cylinder of the braking actuator hydraulic pressure system constituent element. The braking pedal simulator 520 is connected to the master cylinder through the braking valve. Accordingly, the braking feel may vary depending on the pressure of the master cylinder.

Figure 5:
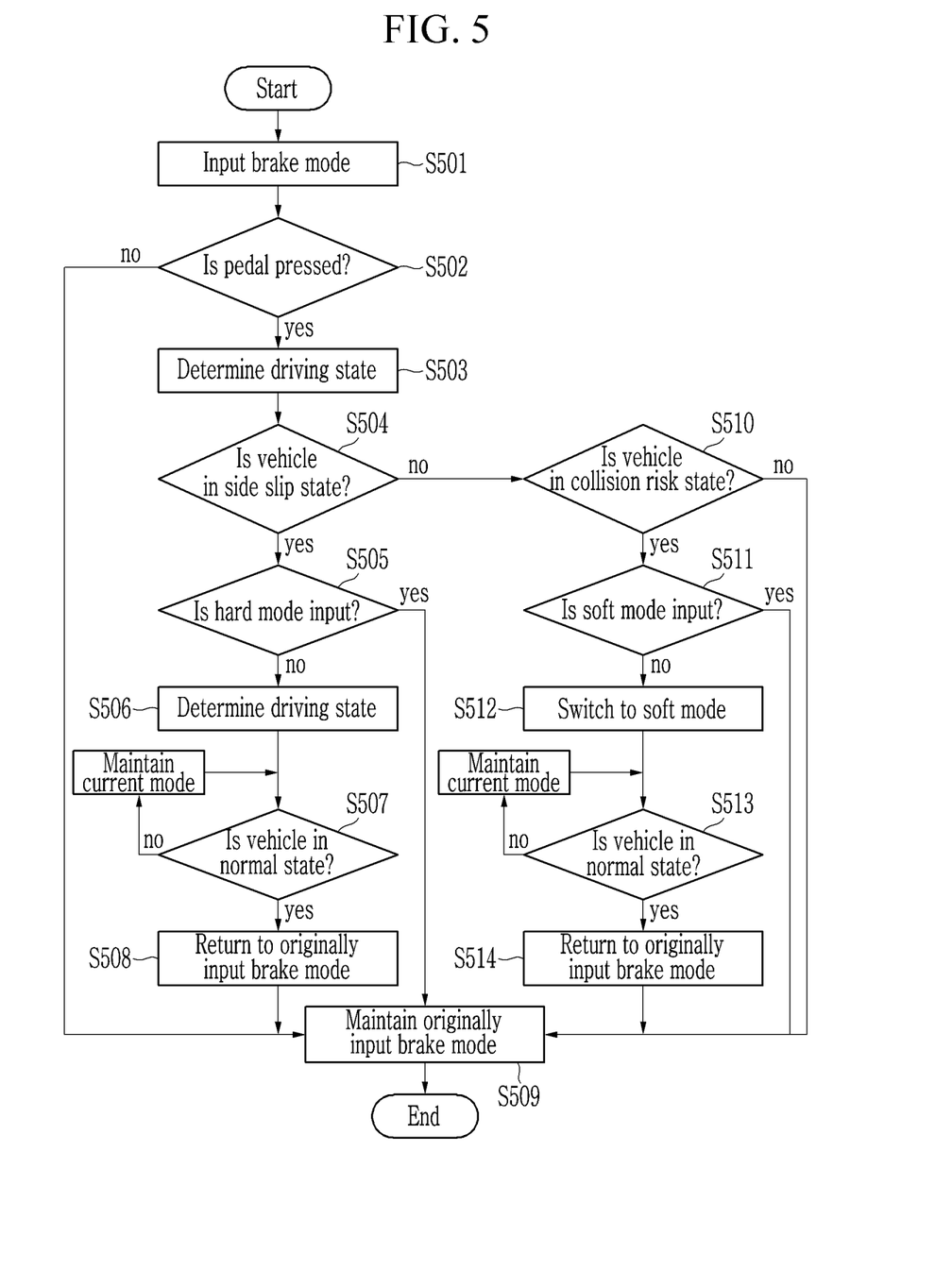
FIG. 5 shows a flowchart of a brake mode control method for a vehicle according to an exemplary embodiment of the present disclosure.

FIG. 5 shows a flowchart of a brake mode control method for a vehicle according to an exemplary embodiment of the present disclosure.

At step S501, the user interface 10 receives the brake mode input by the driver.

At step S502, the braking sensor 20 senses whether the braking pedal is pressed.

As a result of the step S502, when it is detected that the braking pedal is pressed, the braking controller 40 determines the driving state of the vehicle based on the driving information of the vehicle sensed by the driving information sensor 30 at step S503. If it is not detected that the braking pedal is pressed, the control method proceeds to step S509 such that the braking controller 40 maintains the originally input brake mode.

At step S504, the braking controller 40 determines whether the side slip is detected, in other words, whether the vehicle is in the side slip state.

As a result of the step S504, if the vehicle is in the side slip state, the braking controller 40 determines whether the input brake mode is the hard mode at step S505.

As the result of the step S505, if the input brake mode is the hard mode, the control method proceeds to the step S509, and the braking controller 40 maintains the originally input brake mode. If the input brake mode is not the hard mode, the braking controller 40 switches the brake mode to the hard mode at step S506.

At step S507, the braking controller 40 continuously monitors the driving state of the vehicle, and if it is determined that the vehicle is restored to the normal driving state, the braking controller 40 returns the brake mode to the originally input brake mode at step S508. If it is determined that the vehicle is not restored to the normal driving state, the current brake mode is maintained.

As a result of the step S504, if the vehicle is not in the side slip state, the braking controller 40 determines whether the obstacle is detected, in other words, whether the vehicle is in the collision risk state at step S510.

As a result of the step S510, if the vehicle is in the collision risk state, the braking controller 40 determines whether the input brake mode is in the soft mode at step S511.

As a result of the step S511, if the input brake mode is the soft mode, the control method proceeds to the step S509, and the braking controller 40 maintains the originally input brake mode. If the input brake mode is not the soft mode, the braking controller 40 switches the brake mode to the soft mode at step S512.

At step S513, the braking controller 40 continuously monitors the driving state of the vehicle, and if it is determined that the vehicle is restored to the normal driving state, the braking controller 40 returns the brake mode to the originally input brake mode at step S514. If it is determined that the vehicle is not restored to the normal driving state, the current brake mode is maintained.

Figure 6:
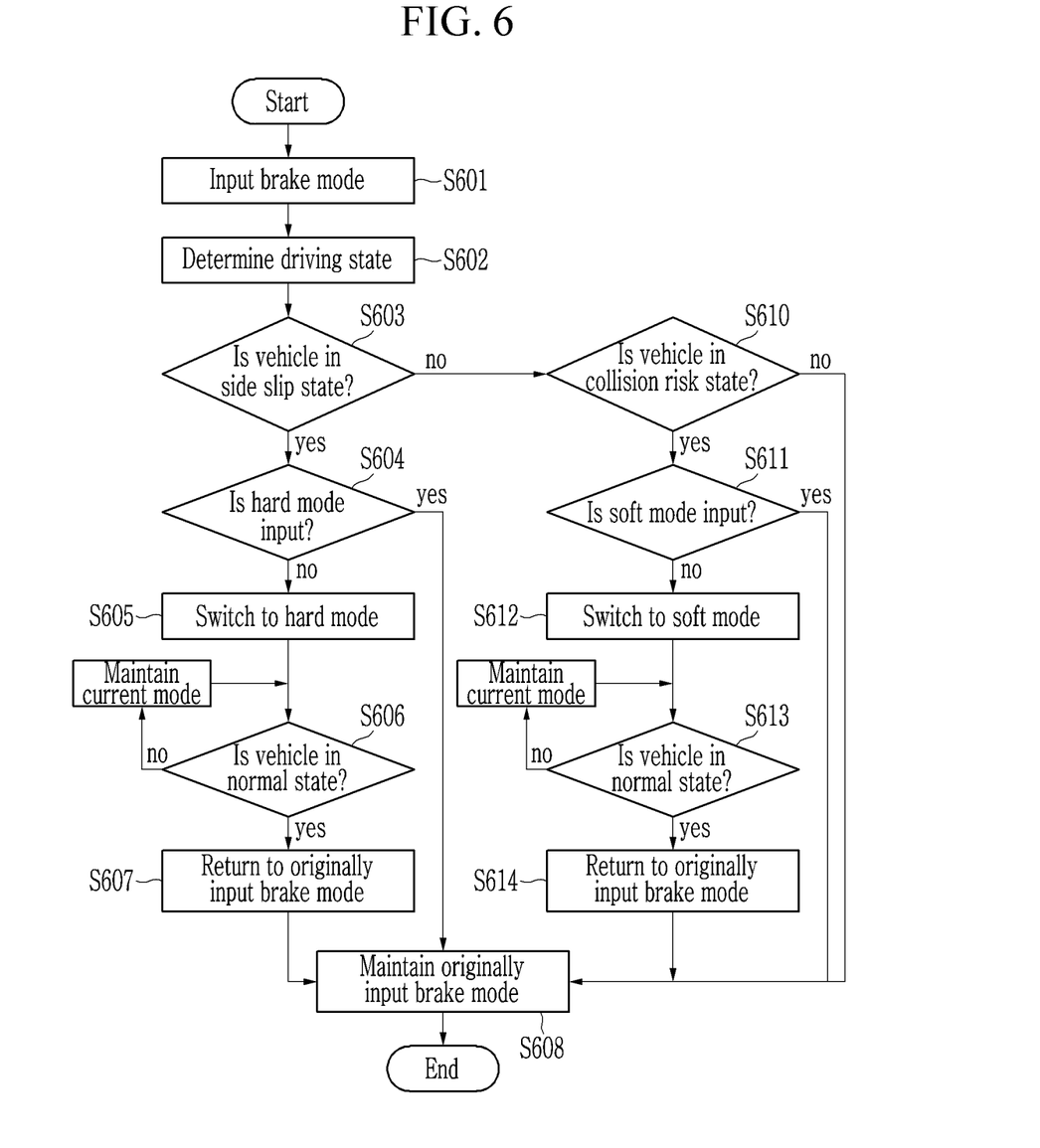
FIG. 6 is a flowchart of a brake mode control method for a vehicle according to another exemplary embodiment of the present disclosure.

FIG. 6 is a flowchart illustrating a process of the brake mode control method for a vehicle according to an exemplary embodiment of the present disclosure.

At step S601, the user interface 10 receives the brake mode input by the driver.

At step S602, the braking controller 40 determines the driving state of the vehicle based on the driving information of the vehicle sensed by the driving information sensor 30.

At step S603, the braking controller 40 determines whether the side slip has been detected, in other words, whether the vehicle is in the side slip state.

As a result of the step S603, if the vehicle is in the side slip state, the braking controller 40 determines whether the input brake mode is the hard mode at step S604, As a result of the step S604, if the input brake mode is the hard mode, the control method proceeds to a step S608, and the braking controller 40 maintains the originally input brake mode. If the input brake mode is not the hard mode, the braking controller 40 switches the brake mode to the hard mode at step S605.

At step S606, the braking controller 40 continuously monitors the driving state of the vehicle. When it is determined that the vehicle returns to the normal driving state, the braking controller 40 returns the brake mode to the originally input brake mode at step S607. If it is determined that the vehicle is not recovered to the normal driving state, the current brake mode is maintained.

As a result of the step S603, if the vehicle is not in the side slip state, the braking controller 40 determines whether the obstacle is detected, in other words, whether the vehicle is in the collision risk state at step S610.

As a result of the step S610, if the vehicle is in the collision risk state, the braking controller 40 determines whether the input brake mode is the soft mode at step S611.

As a result of the step S611, if the input brake mode is the soft mode, the control method proceeds to the step S608, and the braking controller 40 maintains the originally input brake mode. If the input brake mode is not the soft mode, the braking controller 40 switches the brake mode to the soft mode at step S612.

At step S613, the braking controller 40 continuously monitors the driving state of the vehicle. When it is determined that the vehicle returns to the normal driving state, the braking controller 40 returns the brake mode to the originally input brake mode at step S614. If it is determined that the vehicle is not returned to the normal driving state, the current brake mode is maintained.

As a result of the step S610, if the vehicle is not in the collision risk state, the control method proceeds to the step S608, and the braking controller 40 maintains the originally input brake mode.

The brake mode control system for a vehicle and the brake mode control method disclosed in the above embodiment automatically change the brake mode input by the driver in advance when emergency braking is required or when braking is not desired, according to the actual driving situation of the vehicle, thereby improving driving safety while satisfying the driving preference of the driver.

For clear explanation, the exemplary method of the present disclosure described above has been expressed in a series of steps, but it is not intended to limit the order of the execution steps. In addition, each step may be implemented simultaneously or may be implemented in a different order as necessary. In order to implement the method according to an exemplary embodiment of the present disclosure, the illustrated steps may further comprise other steps, include the remaining steps excluding some steps, or include other additional steps excluding some steps.

In addition, the present disclosure may be implemented by hardware, firmware, software, or a combination thereof. Hardware may be implemented by at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general-purpose processors, controllers, microcontrollers, and microprocessors.

The range of the present disclosure includes software or machine-executable instructions (e.g., operating system, application, firmware, program, etc.) that allow an operation according to various embodiments to be implemented on a device or a computer, and a device in which such software or instructions are stored, or non-volatile computer-readable media that is executable on the computer.

The description of the exemplary embodiments is merely for describing the technical solution of the present disclosure, is not intended to describe the complete form of the disclosure, and is not also intended to limit the present disclosure to the described precise form. It is apparent that a person of an ordinary skill in the art may make various modifications and changes based on the implication. To select and describe exemplary embodiments may make the understanding of others skilled in the art easy by interpreting specific principles of the present disclosure and practical applications thereof, thereby implementing and utilizing various exemplary embodiments of the present disclosure and various alternative forms and modification forms. The scope of the present disclosure is limited by the appended claim range and equivalent forms.

What is claimed is:

1. A brake mode control system for a vehicle, comprising:
 a user interface configured to receive a brake mode input by a driver;
 a driving information sensor configured to sense driving information of the vehicle;
 a braking controller configured to:
  determine a driving state of the vehicle based on the driving information of the vehicle sensed by the driving information sensor; and
  selectively change the brake mode received by the user interface according to the determined driving state of the vehicle to achieve a final brake mode; and
 a brake mode control panel configured to generate a different braking feel according to a pedal action force required for a pedal stroke based on the final brake mode;
 wherein the brake mode comprises a hard mode, a soft mode, and a normal mode; and
 wherein the driving information sensor comprises a side slip sensing module comprising:
  a yaw rate sensor;
  a wheel speed sensor;
  a steering angle sensor;
  a lateral direction acceleration sensor; and
  a longitudinal direction acceleration sensor; and
 wherein the braking controller is farther configured to selectively change the brake mode according to whether the vehicle is in a side slip state.

2. The system of claim 1, wherein the braking controller is configured to:
 determine whether the vehicle is in a side slip state;
 determine whether the input brake mode is a hard mode if the vehicle is in the side slip state; and
 maintain the hard mode unchanged if the input brake mode is the hard mode and switch the brake mode to the hard mode if the input brake mode is not the hard mode.

3. The system of claim 2, wherein the braking controller is configured to:
 calculate a yaw rate calculation value based on a sensing value from each of the wheel speed sensor, the steering angle sensor, the lateral direction acceleration sensor, and the longitudinal direction acceleration sensor; and
 compare a yaw rate sensing value from the yaw rate sensor with the calculated yaw rate calculation value, forming a comparison, to determine whether the vehicle is in the side slip state according to a result of the comparison.

4. The system of claim 3, wherein:
 the driving information sensor further comprises an obstacle sensing module,
 the obstacle sensing module comprises:
  a front camera configured to acquire front image information of the vehicle and position information and speed information of an obstacle in front of the vehicle;
  a front radar configured to acquire the position information and the speed information of the obstacle in front of the vehicle; and
  at least two rear corner radars configured to acquire position information and speed information of an obstacle in rear or side-rear of the vehicle, and
 the obstacle sensing module is configured to calculate an expected time-to-collision between the vehicle and the obstacle in front, rear, or side-rear of the vehicle based on at least one of the following:
  the front image information;
  the position information; and
  the speed information.

5. The system of claim 4, wherein the braking controller is configured to:
 further determine whether the vehicle is in a collision risk state if the vehicle is not in the side slip state,
 determine whether the input brake mode is a soft mode if the vehicle is in the collision risk state, and maintain the soft mode unchanged if the input brake mode is the soft mode, and switch the brake mode to the soft mode if the input brake mode is not the soft mode.

6. The system of claim 5, wherein the braking controller is configured to compare the expected time-to-collision calculated by the obstacle sensing module with a predetermined reference time and determine whether there is a risk that the vehicle will collide with the obstacle to determine whether the vehicle is in the collision risk state.

7. The system of claim 2, wherein the braking controller is configured to return the brake mode to an originally input brake mode if the vehicle is in a normal state after the brake mode is switched.

8. A vehicle comprising a brake mode control system of claim 1.

9. A brake mode control method for a vehicle, comprising:
receiving, by a user interface, a brake mode input by a driver;
sensing, by a driving information sensor, driving information of the vehicle;
determining, by a braking controller, a driving state of the vehicle based on the driving information of the vehicle sensed by the driving information sensor;
selectively changing, by the braking controller, the brake mode received by the user interface according to the determined driving state of the vehicle to achieve a final brake mode;
generating, by a brake mode control panel, a different braking feel according to a pedal action force required for a pedal stroke based on the final brake mode;
wherein the brake mode comprises a hard mode, a soft mode, and a normal mode;
wherein the driving information sensor comprises a side slip sensing module, and the side slip sensing module comprises a yaw rate sensor, a wheel speed sensor; a steering angle sensor, a lateral direction acceleration sensor, and a longitudinal direction acceleration sensor; and
selectively changing, by the braking controller, the brake mode according to whether the vehicle is in a side slip state.

10. The method of claim 9, further comprising, by the braking controller:
determining whether the vehicle is in a side slip state;
determining whether the input brake mode is a hard mode if the vehicle is in the side slip state; and
maintaining the hard mode unchanged if the input brake mode is the hard mode, and switching, by the braking controller, the brake mode to the hard mode if the input brake mode is not the hard mode.

11. The method of claim 10, wherein the determining whether the vehicle is in the side slip state comprises, by the braking controller:

calculating a yaw rate calculation value based on a sensing value from each of the wheel speed sensor, the steering angle sensor, the lateral direction acceleration sensor, and the longitudinal direction acceleration sensor; and
comparing a yaw rate sensing value from the yaw rate sensor with the calculated yaw rate calculation value, forming a comparison, to determine whether the vehicle is in the side slip state according to a result of the comparison.

12. The method of claim 11, wherein:
the driving information sensor further comprises an obstacle sensing module,
the obstacle sensing module comprises:
a front camera configured to acquire front image information of the vehicle and position information and speed information of an obstacle in front of the vehicle;
a front radar configured to acquire the position information and the speed information of the obstacle in front of the vehicle; and
at least two rear corner radars configured to acquire position information and speed information of an obstacle in rear or side-rear of the vehicle, and
the obstacle sensing module is configured to calculate an expected time-to-collision between the vehicle and the obstacle in front, rear, or side-rear of the vehicle based on at least one of the following:
the front image information;
the position information; and
the speed information.

13. The method of claim 12, further comprising, by the braking controller:
determining whether the vehicle is in a collision risk state if the vehicle is not in the side slip state;
determining whether the input brake mode is a soft mode if the vehicle is in the collision risk state, and
maintaining the soft mode unchanged if the input brake mode is the soft mode, and switching the brake mode to the soft mode if the input brake mode is not the soft mode.

14. The method of claim 13, wherein the determining whether the vehicle is in the collision risk state comprises:
determining, by the braking controller, whether there is a risk that the vehicle will collide with an obstacle to determine whether the vehicle is in the collision risk state by comparing the expected time-to-collision calculated by the obstacle sensing module with a predetermined reference time.

15. The method of claim 10, further comprising returning, by the braking controller, the brake mode to an originally input brake mode if the vehicle is in a normal state after the brake mode is switched.

* * * * *